Figure 1:
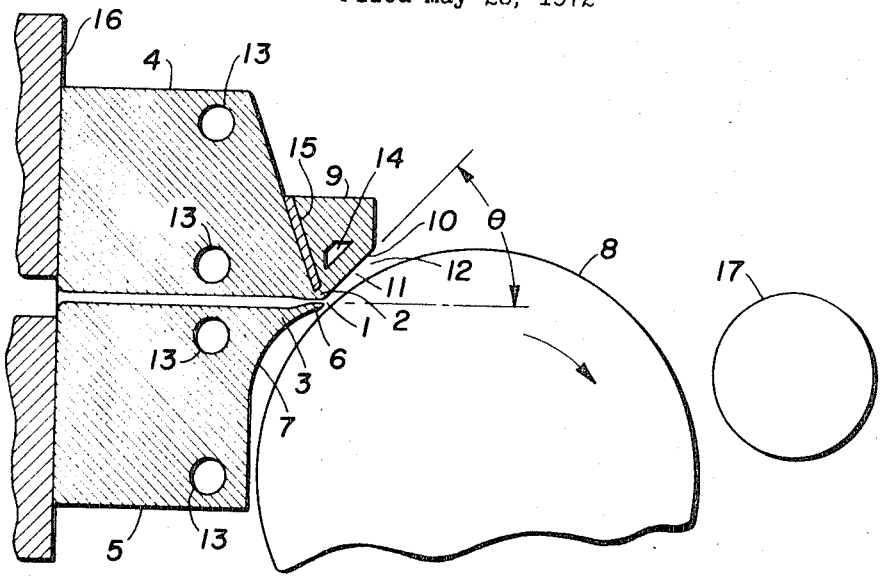
Figure 2:
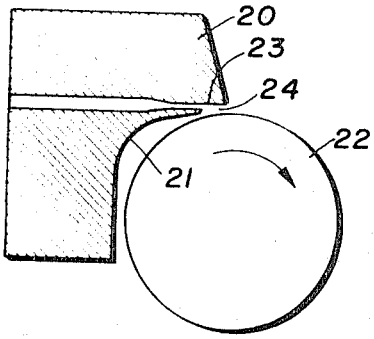
Figure 3:
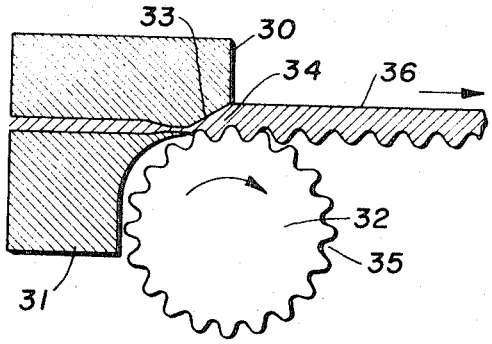

DEFENSIVE PUBLICATION

UNITED STATES PATENT OFFICE

Published at the request of the applicant or owner in accordance with the Notice of Dec. 16, 1969, 869 O.G. 687. The abstracts of Defensive Publication applications are identified by distinctly numbered series and are arranged chronologically. The heading of each abstract indicates the number of pages of specification, including claims and sheets of drawings contained in the application as originally filed. The files of these applications are available to the public for inspection and reproduction may be purchased for 30 cents a sheet.

Defensive Publication applications have not been examined as to the merits of alleged invention. The Patent Office makes no assertion as to the novelty of the disclosed subject matter.

PUBLISHED JULY 10, 1973

912 O.G. 400

T912,003

EXTRUSION OF RESINS

Keith Marchant, Newport, and Durgacharan Sen, Cwmbran, Wales, assignors to Monsanto Chemicals Limited, London, England

Filed May 23, 1972, Ser. No. 256,060
Int. Cl. B29d *27/00*
U.S. Cl. 264—51
1 Sheet Drawing. 25 Pages Specification

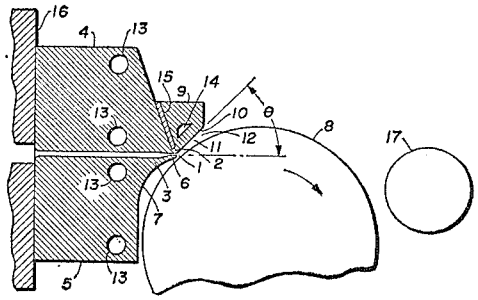

A sheet of foamed thermoplastic synthetic resin is made by extruding a foamable thermoplastic synthetic resin through a slit die. The die comprises an exit zone defined by a pair of opposing surfaces. One of the surfaces moves in the direction of the extrusion and is convex in that direction. The other surface is planar. Foaming of the resin occurs as it moves through the exit zone. The relative spacing of the surfaces is such that they contact the expanding and foaming resin and a foamed resin sheet is produced.

EXTRUSION OF RESINS

Filed May 23, 1972